United States Patent
Cotter

(10) Patent No.: US 9,144,864 B2
(45) Date of Patent: Sep. 29, 2015

(54) TOE CLAMP, AND RELATED MANUFACTURING METHOD, CLAMPING ARRANGEMENT, AND FIXTURE

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 127 days.

(21) Appl. No.: 14/017,852

(22) Filed: Sep. 4, 2013

(65) Prior Publication Data

US 2014/0069164 A1    Mar. 13, 2014

Related U.S. Application Data

(60) Provisional application No. 61/698,871, filed on Sep. 10, 2012.

(51) Int. Cl.

| B23P 13/00 | (2006.01) |
| B21D 37/10 | (2006.01) |
| B21K 5/20 | (2006.01) |
| B23Q 3/02 | (2006.01) |
| F16B 2/08 | (2006.01) |
| B25B 5/12 | (2006.01) |

(52) U.S. Cl.
CPC ............... B23P 13/00 (2013.01); B21D 37/10 (2013.01); B21K 5/20 (2013.01); B23Q 3/02 (2013.01); B25B 5/12 (2013.01); F16B 2/08 (2013.01); *Y10T 29/49996* (2015.01)

(58) Field of Classification Search
CPC ........... B23P 13/00; B21D 37/10; B25B 5/12; Y10T 29/4996; F16B 2/08; B21K 5/20; B23Q 3/02

See application file for complete search history.

(56) References Cited

U.S. PATENT DOCUMENTS

| 2,667,799 | A | | 2/1954 | Rzepela |
| 2,760,535 | A | | 8/1956 | Mertz |
| 4,049,253 | A | | 9/1977 | Mandel |
| 4,489,927 | A | | 12/1984 | Yamada et al. |
| 4,610,185 | A | * | 9/1986 | France ............................. 76/29 |
| 5,964,458 | A | * | 10/1999 | Cutsforth et al. ............. 269/137 |
| 6,202,996 | B1 | * | 3/2001 | Cutsforth et al. ............. 269/137 |
| 6,422,931 | B1 | * | 7/2002 | Laflamme ..................... 451/365 |
| 6,435,496 | B1 | * | 8/2002 | Phillips .......................... 269/94 |
| 8,151,619 | B2 | | 4/2012 | Pyper et al. |
| 2011/0192206 | A1 | | 8/2011 | Cotter |
| 2012/0112010 | A1 | | 5/2012 | Young et al. |
| 2012/0151984 | A1 | | 6/2012 | Breen et al. |
| 2012/0151985 | A1 | | 6/2012 | Breen et al. |

OTHER PUBLICATIONS

Standard Components for Press Die 2004-2005, Sankyo Oilless Industry, Inc., 3 pages.
Standard Lifters, Inc. Making Innovation the Standard Why Use Guided Keepers Guidance and Retention-All-In-One, http://www.standardlifters.com/patents.html for details, 28 pgs.
DADCO, Guide Retainer Sets, GRS Series, Catalog No. C12116, Combined Guidance and Retention, New Toe Clamp Options Now Available, 8 pages.

* cited by examiner

*Primary Examiner* — David B Jones
(74) *Attorney, Agent, or Firm* — Reising Ethington P.C.

(57) ABSTRACT

Toe clamps generally shaped like hollow cylinder sectors or ring segments, methods of manufacturing such toe clamps, a toe clamping arrangement including such toe clamps, and a fixture for use in manufacturing such toe clamps.

16 Claims, 13 Drawing Sheets

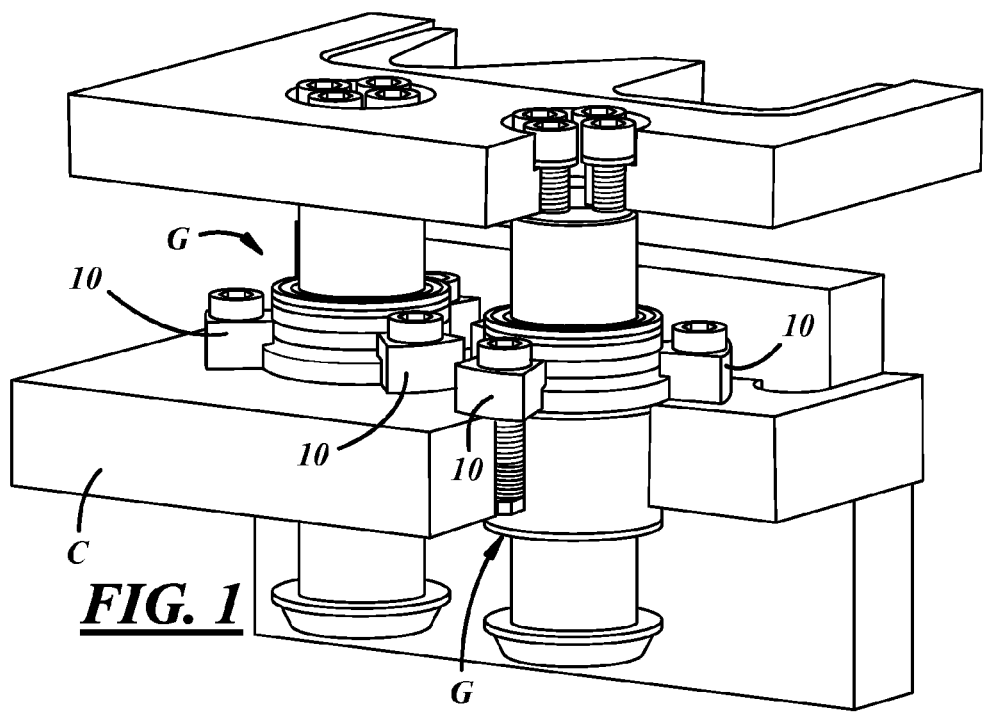
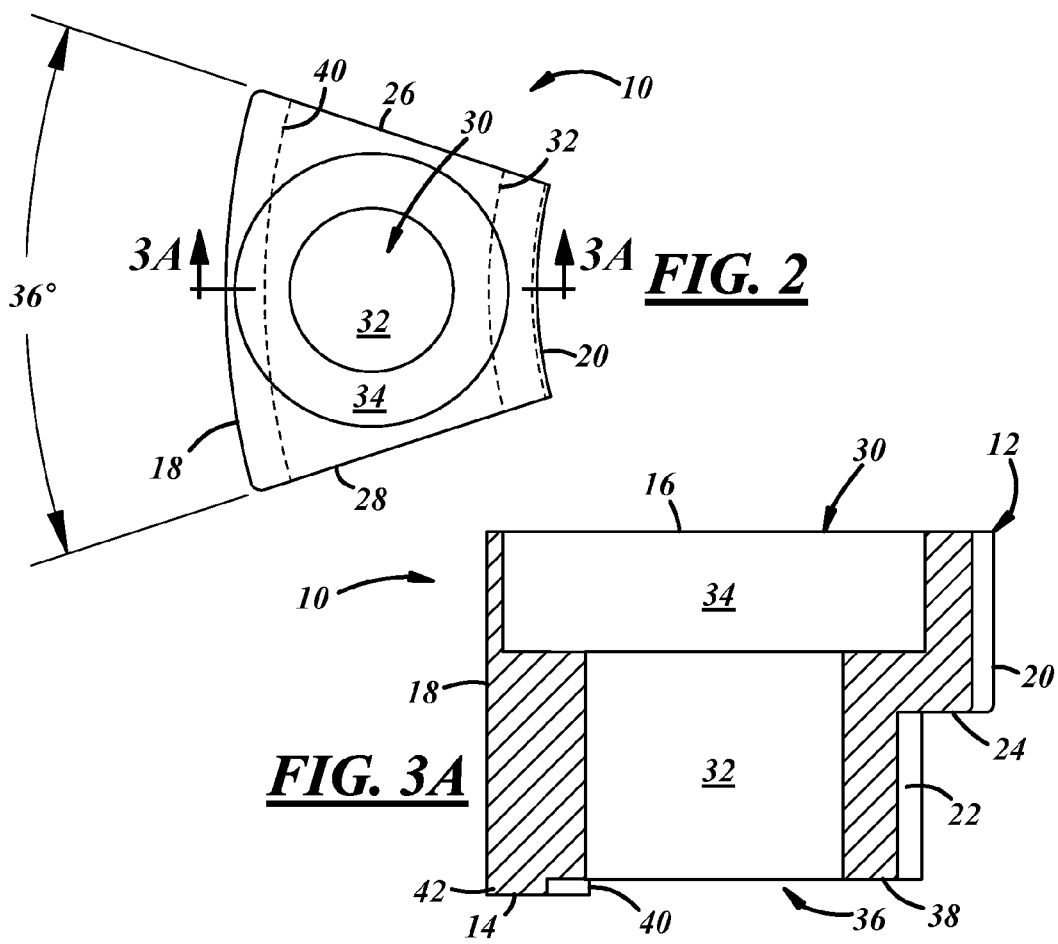

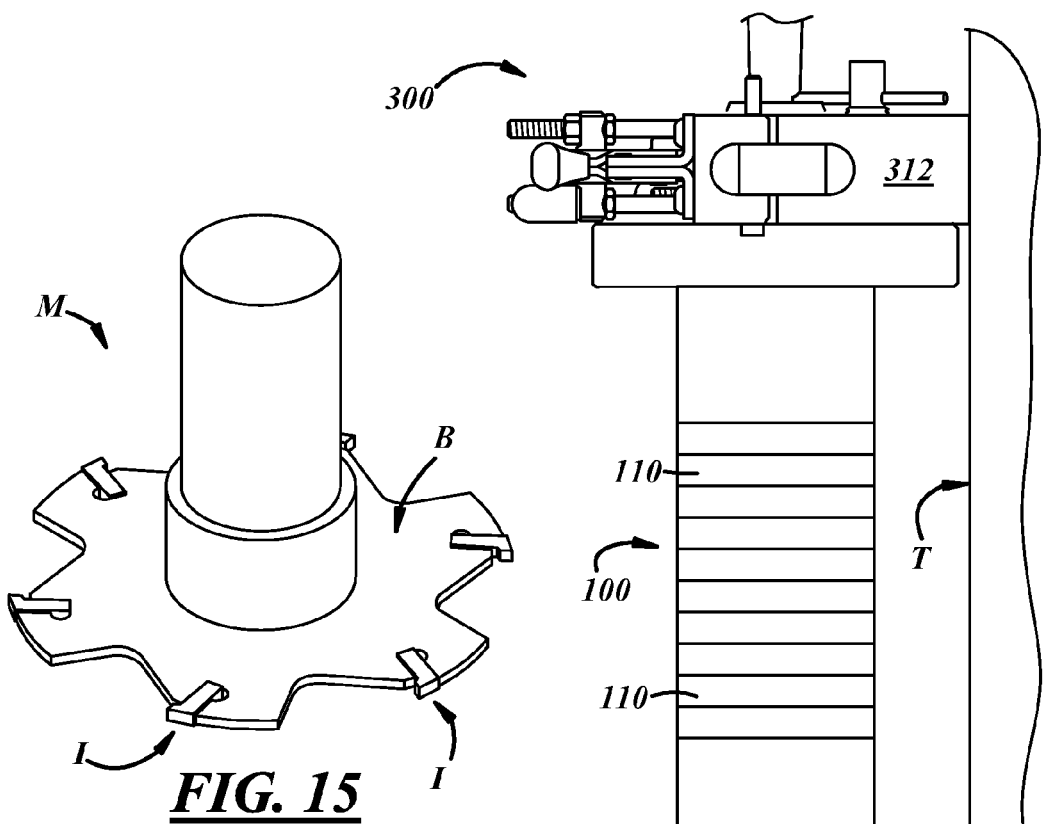
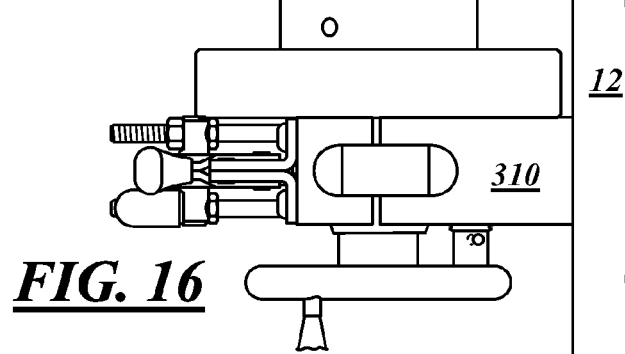
FIG. 15
FIG. 16
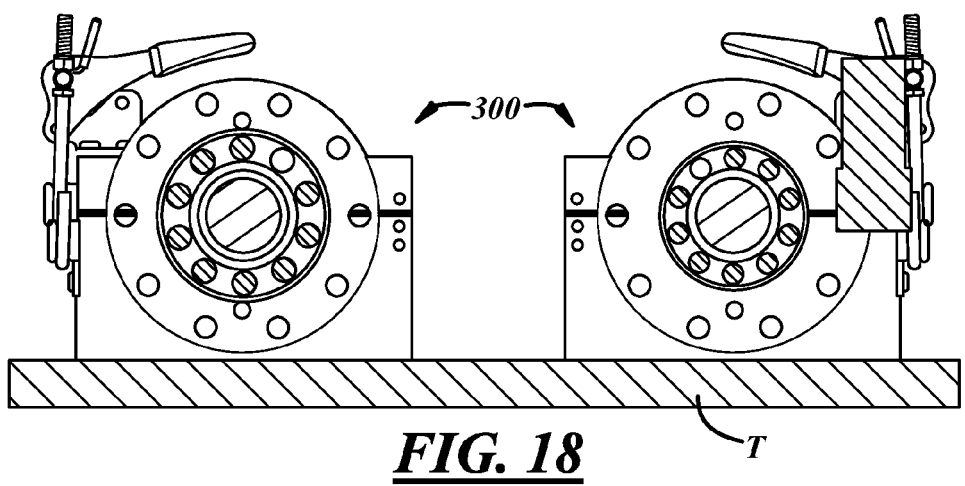
FIG. 18

TOE CLAMP, AND RELATED MANUFACTURING METHOD, CLAMPING ARRANGEMENT, AND FIXTURE

TECHNICAL FIELD

This disclosure relates generally to clamps, and more particularly to manufacturing of toe clamps.

BACKGROUND

Toe clamps are used to clamp many different types of tools and die components. Typically, toe clamps are of rectangular shape, and manufactured one at a time from machined bar stock or from stamped heavy-gage sheet metal.

SUMMARY

A toe clamp according to one implementation includes a bottom surface, a top surface spaced apart from the bottom surface, a cylindrical radially outer end surface extending between the bottom and top surfaces and having a centerline, and a cylindrical radially inner end surface extending between the bottom and top surfaces and having the same centerline as the radially outer end surface. The toe clamp also includes a pair of circumferentially facing side surfaces radially extending between the radially inner and outer end surfaces along directions that substantially intersect the same centerline as that of the end surfaces, and a passage extending between and intersecting at least one of the bottom and top surfaces and located circumferentially between the pair of circumferentially facing side surfaces.

A method of manufacturing toe clamps according to one implementation, includes machining a plurality of cylindrical blanks, each including throughbores, and stacking the blanks to circumferentially align the throughbores and establish a blank stack having a longitudinal centerline. The method also includes cutting the blank stack along an axial direction parallel to the longitudinal centerline, and along a radial direction that radially intersects the longitudinal centerline, and circumferentially between adjacent throughbores to produce a plurality of toe clamps generally shaped like hollow cylinder sectors.

A method of manufacturing toe clamps according to another implementation, includes turning a plurality of cylindrical blanks into turned blanks, each having an inside diameter and an outside diameter, and machining the turned blanks into machined blanks, each having a plurality of circumferentially spaced throughbores and a plurality of circumferentially spaced counterbores corresponding to the throughbores. The method also includes stacking the machined blanks to radially align the inside and outside diameters and circumferentially align the arrays of throughbores to produce a radially and circumferentially aligned blank stack having a longitudinal centerline. The method further includes slitting the blank stack along an axial direction parallel to the longitudinal centerline, and along a radial direction that radially intersects the longitudinal centerline, in a plurality of locations circumferentially between adjacent counterbores to produce a plurality of toe clamps in the general shape of cylindrical ring segments.

According to another implementation, a fixture is provided to carry a radially and circumferentially aligned stack of cylindrical blanks, each having inside and outside diameters and a plurality of circumferentially spaced throughbores disposed between the inside and outside diameters. The fixture includes a mandrel, to extend through inside diameters of the blanks, a first support carried on the mandrel, to contact a first end of the stack, and a plurality of tie rods coupled to the first support, wherein the tie rods are disposed in an equidistantly spaced circumferential array, to extend through the throughbores of the blanks. The fixture also includes a second support carried on the mandrel and coupled to the plurality of tie rods, to contact a second end of the stack, wherein the tie rods are tightenable to at least one of the supports to preload the stack between the supports.

BRIEF DESCRIPTION OF THE DRAWINGS

FIG. 1 is a fragmentary perspective view of a presently preferred form of one toe clamping arrangement including toe clamps according to an illustrative embodiment of the present disclosure;

FIG. 2 is a top view of a toe clamp according to an illustrative embodiment of the present disclosure;

FIG. 3A is a cross-sectional view of the toe clamp of FIG. 2 taken along line 3A of FIG. 2;

FIG. 15 is a perspective view of a cutter in accordance with an illustrative embodiment of the present disclosure;

FIG. 16 is an elevational view of the fixture of FIG. 11 mounted to a flat surface of a machine tool;

FIG. 18 is an end view corresponding to FIG. 17;

DETAILED DESCRIPTION OF PREFERRED EMBODIMENTS

Figure 3B:
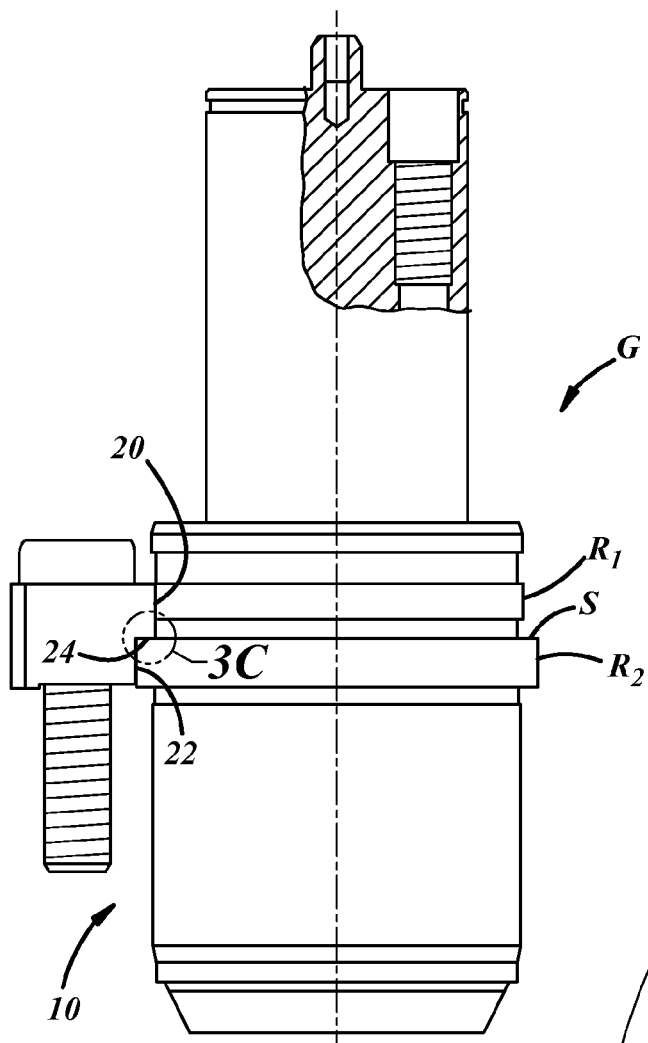
FIG. 3B is a fragmentary elevational view of a toe clamping arrangement including the toe clamp of FIGS. 2 and 3A.

Referring in more detail to the drawings, and according to an illustrative embodiment of the present disclosure, in FIG. 1 a toe clamp 10 includes novel features to provide increased clamping surface area and/or more uniform clamping forces, for example, between a die component C and a die device G to be clamped to the die component, as will be described in greater detail below. In the illustrated embodiment, a plurality of the clamps 10 may be used to clamp shoulder mounted guide retainer sets to a lower or upper die plate. The guide retainer sets may be those described and shown in U.S. Patent Application Publication No. 20011/0192206, the disclosure of which is hereby incorporated herein by reference in its entirety. In other embodiments, the devices to be clamped may include guide bearings, guide pins, gas springs, or any other suitable die devices.

Referring to FIGS. 2 and 3A, The toe clamp 10 includes a body 12 with a first or bottom surface 14 (FIG. 3A), a second or top surface 16 spaced apart from the bottom surface 14, and a radially outer end surface 18 that is cylindrical and extends between the bottom and top surfaces 14, 16 and having a longitudinal central axis or centerline. The bottom and/or top surfaces 14, 16 may be planar.

The toe clamp body 12 also includes a radially inner end surface 20 that is cylindrical and extends between the bottom and top surfaces 14, 16 and preferably has the same centerline as the radially outer end surface 18. The radially inner end surface 20 may be stepped. Accordingly, the toe clamp body 12 also may include a radially intermediate surface 22 extending between the bottom and top surfaces 14, 16, disposed radially outward of and axially spaced from the radially inner end surface 20, and preferably having the same centerline as the radially outer and inner end surfaces 18, 20. Also, the toe clamp body 12 may include an axially facing step or shoulder 24 (FIG. 3A) between the radially inner end surface 20 and intermediate surface 22.

Referring to FIG. 2, the toe clamp body 12 further includes a pair of circumferentially facing side surfaces 26, 28 radially extending between the radially outer and inner end surfaces 18, 20 along directions that substantially intersect the same centerline as that of the end surfaces 18, 20. The circumferentially facing side surfaces 26, 28 "substantially" intersect the centerline, accounting for material removed during manufacturing of the toe clamp body 12. For example, as will be described in greater detail below, a cutter may be used to make a longitudinal and radial cut that establishes the circumferentially facing side surfaces 26, 28. The cutter is moved along a plane that intersects the same centerline as that of the end surfaces (accounting, of course, for manufacturing tolerances). In theory, if the cutter was infinitely thin, the circumferentially facing side surfaces would precisely intersect the centerline. But the cutter has thickness (even a wire EDM, laser, waterjet, or other process offsets the side surface plane by some amount) and, thus, the circumferentially facing side surfaces 26, 28 are said to "substantially" intersect the centerline. In other words, the surfaces 26, 28 intersect the centerline, accounting for the thickness of the cutter and/or the cut made between adjacent opposing surfaces 26, 28 of adjacent clamps 10.

Referring to FIGS. 2 and 3A, the toe clamp body 12 also includes a bore or passage 30 extending between and intersecting at least one of the bottom and top surfaces 14, 16, and located circumferentially between the pair of circumferentially facing side surfaces 26, 28. In one embodiment, the passage 30 may include a throughbore 32 extending between and intersecting the bottom surface 14, and a counterbore 34 extending between and intersecting the top surface 16 and coaxial with the throughbore 32. In another embodiment, the passage 30 includes only the throughbore extending between the upper and lower surfaces. In a further embodiment, the passage 30 could be threaded and the corresponding fastener passage in the die could be counterbored. Also, in one of the illustrated embodiments, only one passage 30 is provided in the toe clamp body 12. But, as shown in FIG. 4, other embodiments include multiple passages in a body 212 of a toe clamp 210, for example, two circumferentially spaced passages 230.

The toe clamp body 12 also may include an annular relief 36 in the bottom surface 14, as shown in the illustrated embodiment. In one embodiment, and as illustrated, the annular relief 36 may take the form of a recessed surface 38 that may establish a radially facing step or shoulder 40 between the bottom surface 14 and the recessed surface 38. The surface 38 may extend and intersect the radially inner end surface 20 or intermediate surface 22. In other embodiments, the annular relief 36 may take the form of a flat angled surface that may extend from the bottom surface 14 to the radially intermediate or end surface 22, 20. In any case, the annular relief 36 may establish an annular or semi-cylindrical axially extending projection 42 immediately adjacent the radially outer end surface 18. The projection 42 or a portion thereof may serve as a fulcrum for the toe clamp 10 to ensure good contact between the toe clamp 10 and the die device G to be clamped.

Figure 3C:
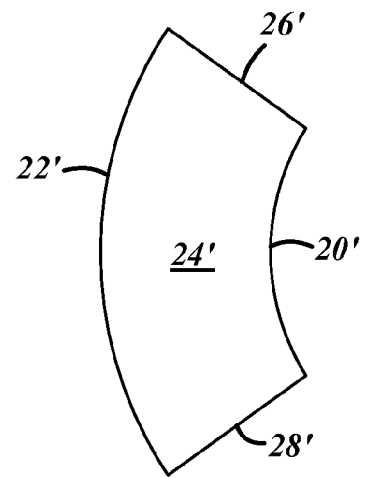
FIG. 3C is a fragmentary portion of the toe clamp of FIG. 3A, illustrating a contact pattern of a clamp shoulder of the toe clamp, and taken from circle 3C of FIG. 3A.
Figure 4:
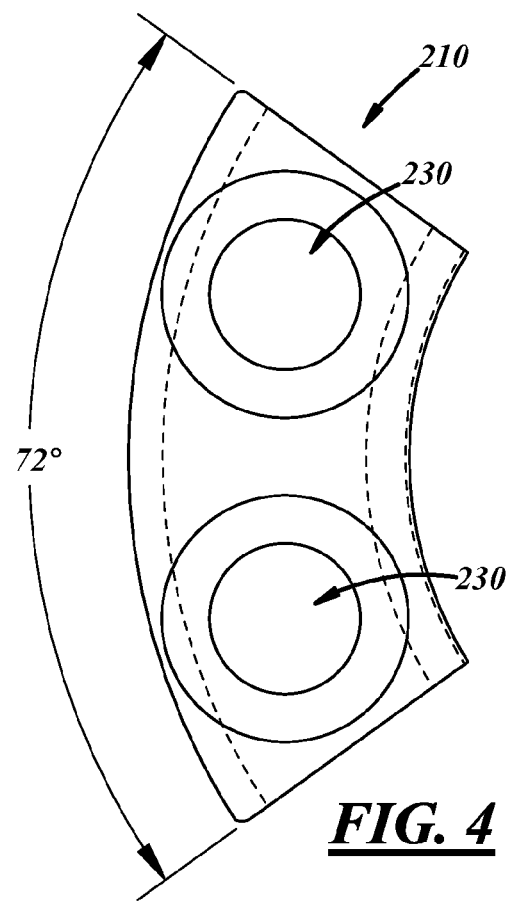
FIG. 4 is a top view of a toe clamp according to another illustrative embodiment of the present disclosure.

Referring to FIG. 3B, the radially inner end surface 20 may be sized to correspond to a first radially outer surface R1 of a die device G that is immediately adjacent to a shoulder surface S of the die device G that is clamped by the toe clamp 10. For example, the radially inner end surface 20 may be of the same or slightly larger diameter as the die device outer surface R1. As used herein, the terminology slightly larger diameter includes within 15% of the diameter. The radially intermediate surface 22 may be sized to correspond to a second radially outer surface R2 of the die device G that is also immediately adjacent the shoulder surface S and axially spaced from the first radially outer surface R1. As represented by FIG. 3C, the clamp shoulder 24 (FIG. 3B) contacts the shoulder surface S (FIG. 3B) according to a contact pattern 24' of semi-annular shape having an outer arc 22', an inner arc 20', and non-parallel, radially extending sides 26', 28' between the arcs 20', 22'.

Figure 5:
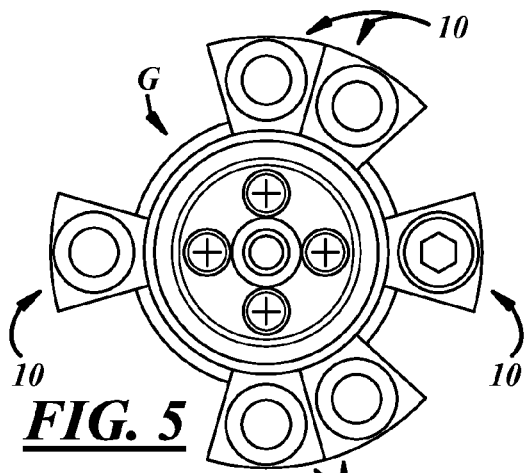
FIG. 5 is a plan view of a toe clamping arrangement according to an illustrative embodiment of the present disclosure including the toe clamp of FIGS. 2 and 3A.
Figure 6:
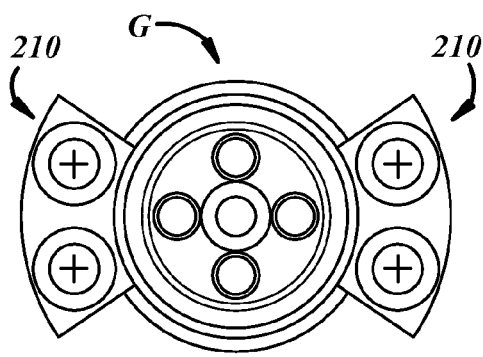
FIG. 6 is a plan view of a toe clamping arrangement according to an illustrative embodiment of the present disclosure including the toe clamp of FIG. 4.
Figure 7:
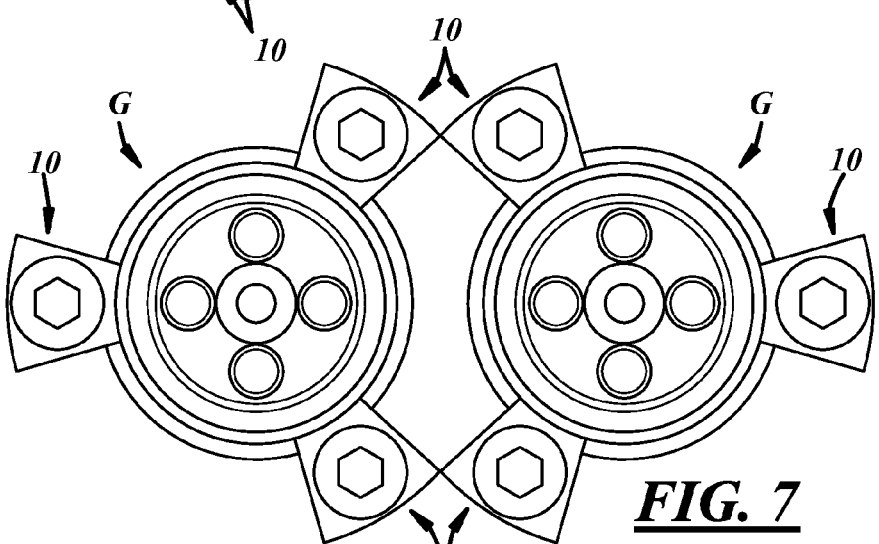
FIG. 7 is a plan view of a toe clamping arrangement according to an illustrative embodiment of the present disclosure including the toe clamp of FIGS. 2 and 3A.
Figure 8:
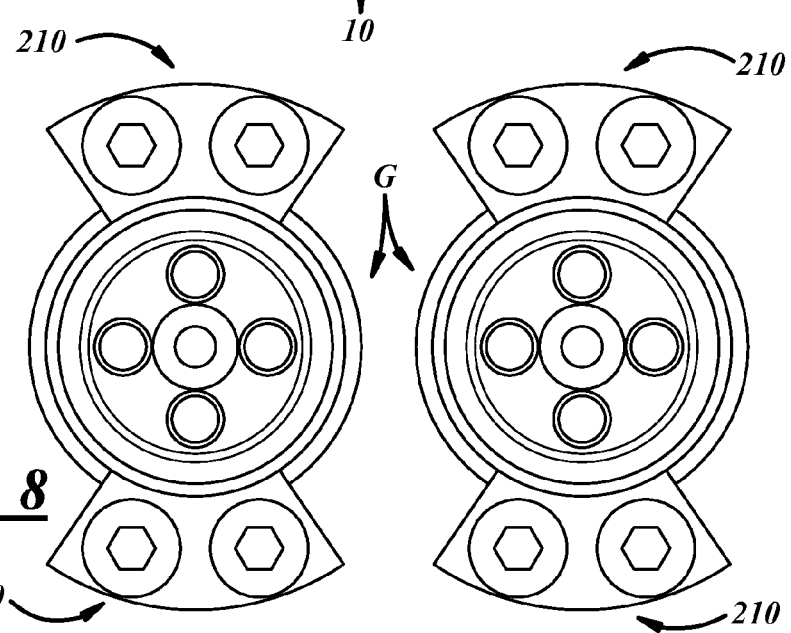
FIG. 8 is a plan view of a toe clamping arrangement according to an illustrative embodiment of the present disclosure including the toe clamp of FIG. 4.

As shown in FIGS. 5 and 6, the toe clamps 10, 210 may be equidistantly circumferentially spaced about a die device G. For example, as shown in FIG. 5, three single bore toe clamps 10 may be circumferentially spaced 120 degrees, or four single bore toe clamps 10 may be circumferentially spaced 90 degrees. Also, as shown in FIG. 6, two double bore toe clamps 210 may be circumferentially spaced 180 degrees. The single bore toe clamps 10 may circumferentially extend 36 degrees, substantially, again because of the material removed by the cutter. The double bore toe clamps 210 may circumferentially extend 72 degrees, substantially, again because of the material removed by the cutter. In another embodiment, a single bore toe clamp 10 may circumferentially extend 54 to 90 degrees, and all subranges therebetween, and preferably 72 degrees. As also shown in FIGS. 7 and 8, the toe clamps 10, 210 require relatively little space between clamps 10, 210 and permit close configurations of die devices G that can be easily customized for irregular device configurations. Although the illustrated embodiments include five double bore clamps or ten single bore clamps, other embodiments may include more or less clamps.

Figure 9:
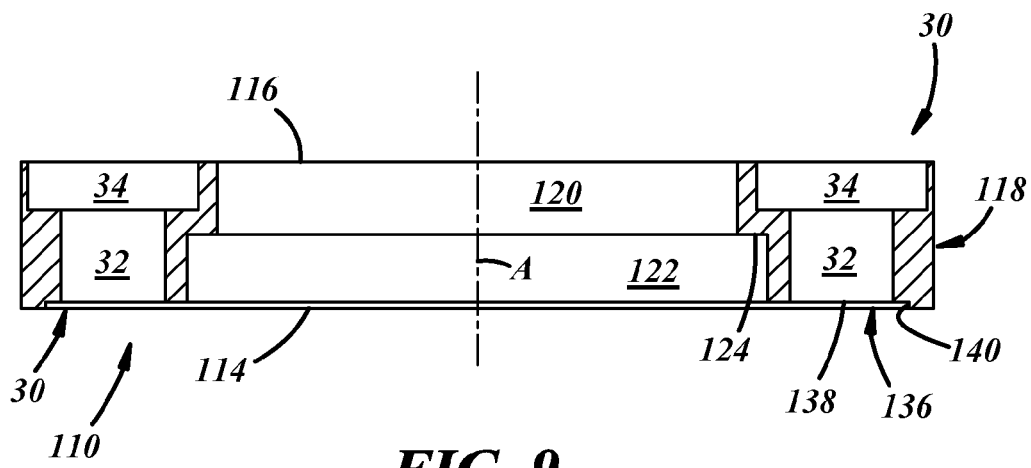
FIG. 9 is a cross-sectional view of a machined blank that may be used to produce the toe clamp of FIGS. 2 and 3A and/or the toe clamp of FIG. 4.
Figure 10:
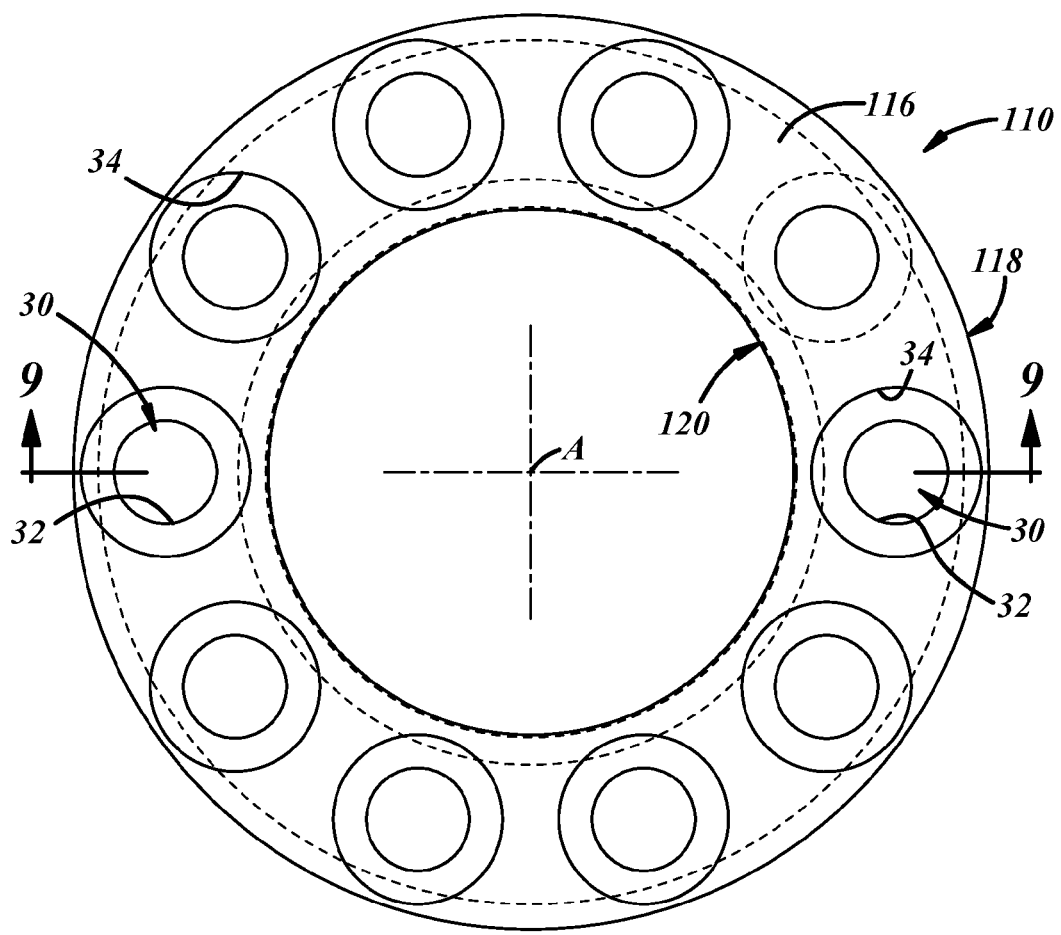
FIG. 10 is a top view of the machine blank of FIG. 9.

With reference to FIGS. 9 and 10, and according to another illustrative embodiment of the present disclosure, the toe clamps 10 of FIGS. 3 and 4 may be manufactured from an annulus or circumferentially continuous ring or a generally cylindrical blank 110 according to a novel method and fixture that will be described in further detail herein below. In general, the method includes machining a plurality of rings or cylindrical blanks 110 to include outside and inside diameters 118, 120, and the passages 30 therebetween. For example, the method may include turning the plurality of cylindrical blanks 110 from solid or hollow bar stock into turned blanks. Also, the method may include machining the turned blanks into machined blanks, each having a plurality of circumferentially spaced throughbores 32 and a plurality of circumferentially spaced counterbores 34 corresponding to the throughbores 32. The blanks 110 may be produced in a CNC lathe machining centerline, or turn-mill centerline, with live drilling, milling, and/or boring tools to provide excellent precision and efficient removal of material at high rates. More particularly, non-cutting time can be minimized using a dual spindle CNC lathe.

In the illustrated embodiment, the blank 110 includes a first or bottom surface 114, a second or top surface 116 spaced apart from the bottom surface 114, and the outer diameter 118 extending between the bottom and top surfaces 114, 116 and having a longitudinal central axis or centerline A. The bottom and/or top surfaces 114, 116 may be planar. The blank 110 also includes the inner diameter 120 extending between the bottom and top surfaces 114, 116 and having the same centerline A.

The inner diameter 120 may be stepped. Accordingly, the blank 110 also may include a radially intermediate diameter 122 extending between the bottom and top surfaces 114, 116, disposed radially outward of and axially spaced from the inner diameter 120, and having the same centerline. Also, the blank 110 may include an axially facing step or shoulder 124 between the diameters 120, 122. The blank 110 also includes the plurality of passages 30 extending between and intersecting at least one of the bottom and top surfaces 114, 116, and equidistantly circumferentially spaced. In one embodiment, the passages 30 may include the throughbores 32 extending between and intersecting the bottom surface 114, and the counterbores 34 extending between and intersecting the top surface 116 and coaxial with the throughbores 32.

The blank 110 also may include an annular relief 136 in the bottom surface 114, as shown in FIG. 9. In one embodiment, and as illustrated, the annular relief 136 may take the form of a recessed surface 138 that may establish a radially facing step or shoulder 140 between the bottom surface 114 and the recessed surface 138. The surface 138 may extend and intersect the inner or intermediate diameters 120, 122. In other embodiments, the annular relief 136 may take the form of a frustoconical surface extending from the bottom surface 114 to the inner or intermediate diameters 120, 122.

Each ring blank 110 yields a plurality of toe clamps depending upon the radial size of the ring blank 110. The yield quantity of toe clamps is dictated by the size of the throughbore and/or counterbore and the diameter of the device to be clamped. In a typical case, ten single bore toe clamps, or five double bore toe clamps, may be yielded per ring blank. Depending on the application, one ring blank may yield enough toe clamps to clamp two to three devices. The toe clamps are typically used in pairs, threesomes, or foursomes.

The method also includes cutting the blank 110 in a radial direction and along a radially and axially extending plane that radially intersects the longitudinal centerline A, and circumferentially between the passages 30 to produce a plurality of toe clamps 10. The blanks 110 are cut between adjacent passages 30, equidistantly therebetween. The method also may include cutting the blank 110 along an axial direction that is parallel to and radially intersects the longitudinal centerline A. Accordingly, the clamps 10 are generally wedge-shaped, or shaped like hollow cylinder sectors or ring segments. As used herein, the term "generally" or "general" and the like, when used to describe a cylindrical shape, mean having a profile that is recognizable as being cylindrically-shaped but is not necessarily only cylindrical and may include stepped surfaces, passages, and the like.

Figure 11:
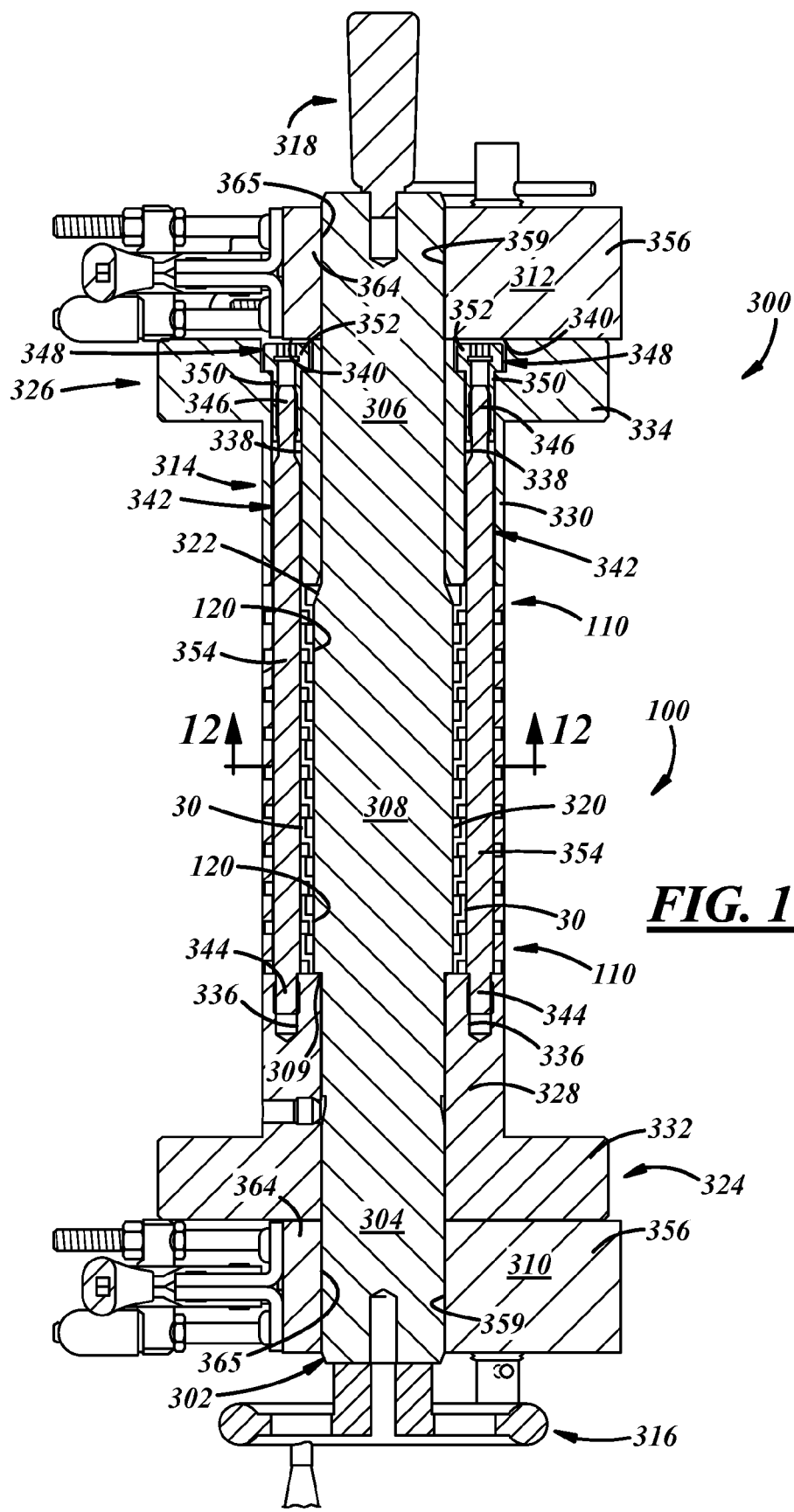
FIG. 11 is a cross-sectional elevational view of a fixture in accordance with an illustrative embodiment of the present disclosure.

Referring now to FIG. 11, the method also may include, before the radial slitting or cutting operation, stacking a plurality of the machined blanks 110. The machined blanks 110 are stacked and aligned. More specifically, the blanks 110 are stacked to radially align the outside and inside diameters 118, 120 thereof and circumferentially align the arrays of passages 30 to produce a radially and circumferentially aligned blank stack 100 having a common longitudinal centerline. Thereafter, the blank stack 100 may be cut in an axial direction parallel to the aligned longitudinal centerline and along a radial direction that radially intersects the aligned longitudinal centerline, and circumferentially between adjacent throughbores to produce a plurality of toe clamps generally shaped like hollow cylinder sectors or ring segments.

Referring still to FIG. 11, and according to a further illustrative embodiment of the present disclosure, a fixture 300 may be used to create the stack 100 of the machined blanks 110. The fixture 300 may include an axle or mandrel 302 having opposed ends 304, 306 and a body having a central portion 308 therebetween to radially align the blanks 110 with respect to one another, clamps 310, 312 carried at and around the opposed ends 304, 306 of the mandrel 302 to axially restrain the blank stack 100, and a rod assembly 314 carried between the clamps 310, 312 and around the mandrel 302 to circumferentially align the blanks 110 with respect to one another. The fixture 300 also may include a rotatable handle 316 fixedly coupled to the first end 304, and a simple handle 318 rotatably or fixedly coupled to the second end 306 to facilitate in removing the rod assembly from the clamps 310, 312. In other embodiments, one or both of the handles may be omitted. The mandrel 302 may be rotatably supported in the clamps 310, 312 to allow the blank stack 100 to be rotated.

The mandrel 302 may include the opposed ends 304, 306 that may be threaded for coupling to the handles 316, 318, and the body central portion 308 that may have a diameter 320 that is larger than those of the opposed ends 304, 306. The mandrel 302 also may include a tapered surface 322 between the outer diameter 320 of the body central portion 308 and a relatively smaller diameter of the second end 306 of the mandrel 302 to pilot inner diameters 120 of the blanks 110. The length of the mandrel 302, including the body central portion 308, may be of any suitable dimension, for example, so as to carry ten blanks as illustrated. The length of the entire fixture 300 is constrained by a cutting tool machine axis that is used to do the cutting or by a desired stiffness of the blank stack 100.

The rod assembly 314 includes opposed blank supports 324, 326 that may include cylindrical bodies 328, 330 that may axially terminate in cylindrical flanges 332, 334 having diameters greater than that of the cylindrical bodies 328, 330. A first support 324 may include an array of threaded holes 336 in a free end of its cylindrical body 328 that corresponds to the array of passages 30 of the blanks 110. A second support 326 may include a corresponding array of throughbores 338 in a free end of its cylindrical body 330 and a corresponding array of counterbores 340 in and an axially opposed second end. The rod assembly 314 also includes a plurality of tie rods 342 that may be coupled to and between the supports 324, 326 in any suitable manner. For example, the rods 342 may have first threaded ends 344 that may be threaded into the threaded holes 336 of the first support 324, second threaded ends 346 that may extend into the throughbores 338 of the second support 326. Nuts 348 may include internally threaded ends 350 extending into the throughbores 338 of the second support 326 for coupling to the second threaded ends 346 of the rods 342 and heads 352 that may be carried in the counterbores 340 of the second support 326. Also, the rods 342 may have cylindrical bodies 354 between the threaded ends 344, 346 for slip fitting through the passages 30 of the blanks 110.

Figure 13:
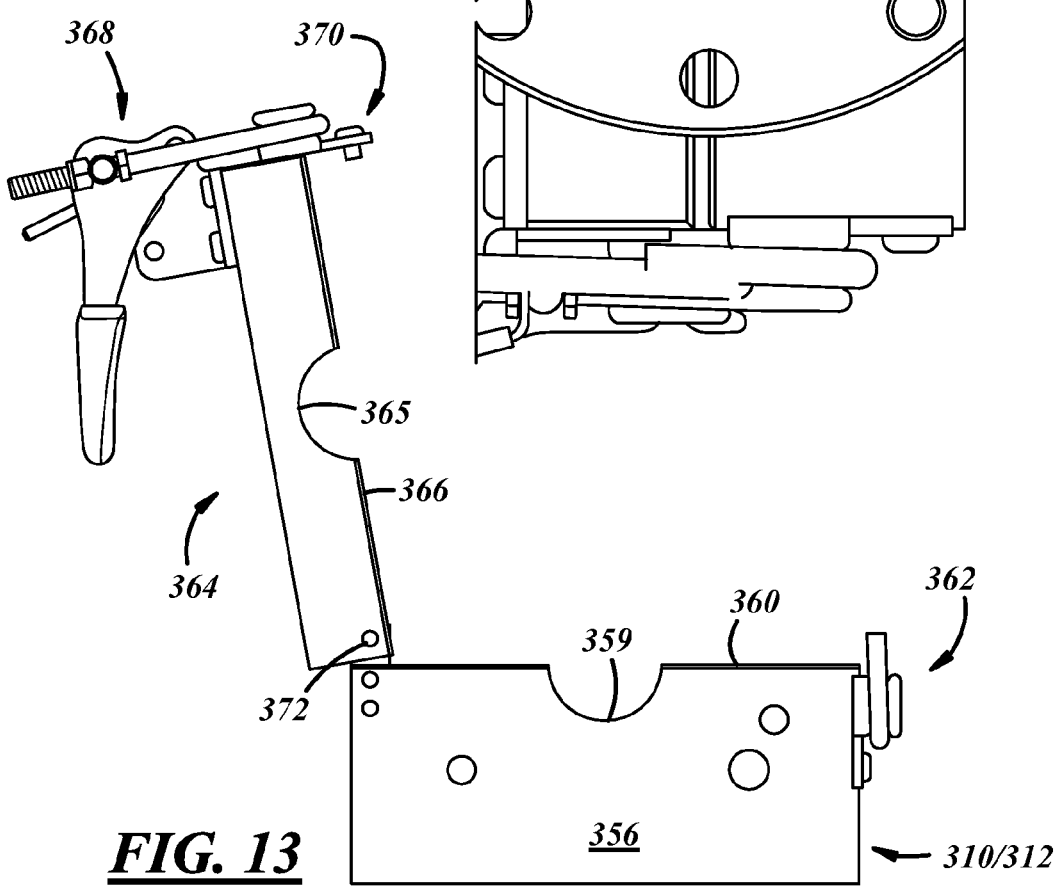
FIG. 13 is an end view of a clamp of the fixture of FIG. 11, illustrated in an open position.

Referring to FIG. 13, the clamps 310, 312 may include bases 356 having mounting surfaces 358 and base surfaces 360 including semi-cylindrical clamping surfaces 359 and having fixed latches 362. The clamps 310, 312 also may include covers 364 having cover surfaces 366 including semi-cylindrical clamping surfaces 365 and having toggle levers 368 carrying movable latches 370, and hinges 372 rotatably coupling the covers 364 to the bases 356.

Referring to FIG. 11, the opposed ends 304, 306 of the mandrel 302 may be cradled in the semi-cylindrical clamping surfaces 359, 365, covered by the clamp covers 364, and clamped between the bases 356 and the covers 364 by the interlocking latches 362, 370 (FIG. 13).

Figure 14A:
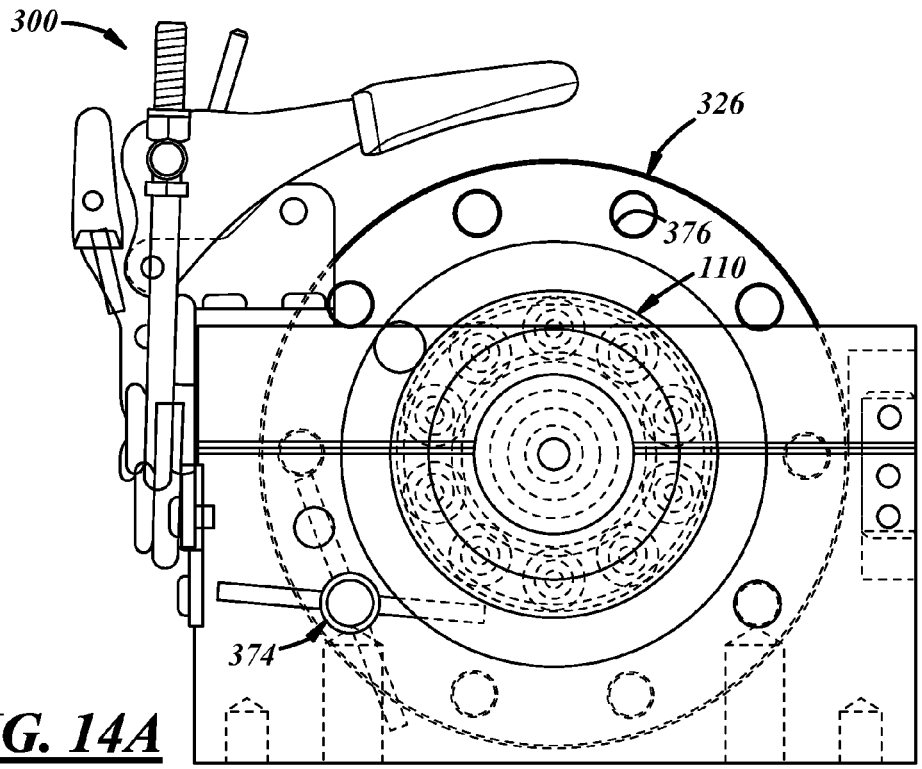
FIG. 14A is a top end view of the fixture of FIG. 11.
Figure 14B:
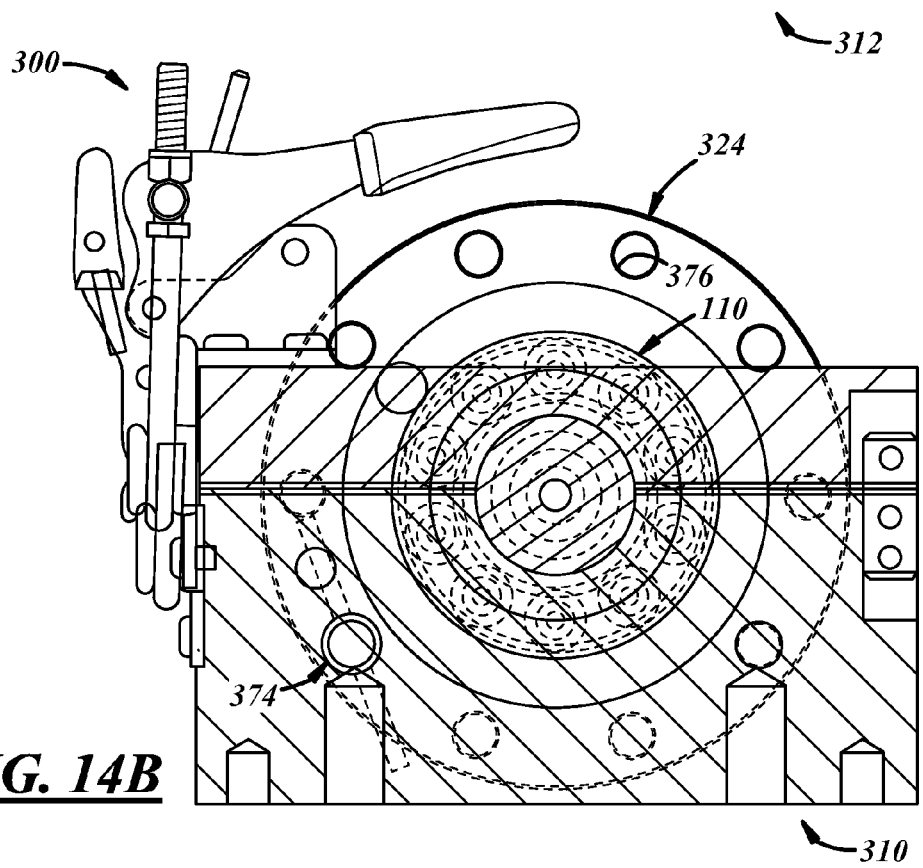
FIG. 14B is a bottom end view of the fixture of FIG. 11.

As illustrated in FIGS. 14A and 14B, one or both of the clamps 310, 312 also may include one or more locators 374 that may be used to fix the blank stack 110 in circumferential positions. For example, the locators 374 may be spring-loaded locator pins that may be biased into an array of equidistantly circumferentially spaced index holes 376 that may be provided in flanges the supports 324, 326. The locators 374 may be retractable out of one of the index holes 376 in the supports 324, 326 to allow rotation or circumferential indexing of the supports 324, 326 and the blank stack 110, whereafter the locators 374 may be released to engage another one of the index holes 376. The locators 374 may be manually actuated for manual indexing or may be automatically actuated by any suitable hydraulic or pneumatic means for automatic indexing. Manual indexing may be accomplished using the rotatable handle, and automatic indexing may be accomplished by a linear cylinder pushing a pawl or ratchet mechanism or by a gear and/or servo mechanism coupled to the fixture 300.

Referring again to FIG. 11, the blanks 110 may be loaded to the fixture 300 in any suitable manner. For example, the tie rods 342 may be coupled to the first support 324, for example, wherein the first threaded ends 344 of the tie rods 342 are threaded into the corresponding threaded holes 336 of the first support 324. Then, the first support 324 with the tie rods 342 assembled thereto may be slid over the first end 304 of the mandrel 302, for example, until the free end of the first support 324 abuts an axial shoulder 309 of the mandrel 308. Next, the inner diameters 120 of the blanks 110 may be radially aligned with the second end 306 of the mandrel 302 and slid thereover, and the passages 30 of the blanks 110 may be circumferentially aligned with the corresponding second threaded ends 346 of the tie rods 342 and slid thereover until the blanks 110 locate against the free end of the first support 324. Accordingly, the blanks 110 are radially constrained by the mandrel 302, and circumferentially and radially restrained by the tie rods 342. Once all the blanks 110 have been loaded to the mandrel 302 and tie rods 342 into the stack 100, the inner diameter of the second support 326 may be radially aligned with the second end 306 of the mandrel 302 and slid thereover, and the throughbores 338 of the second support 326 may be circumferentially aligned with the second threaded ends 346 of the tie rods 342 and slid thereover until the free end of the second support 326 locates against the blank stack 100. Then the nuts 348 may be inserted into the throughbores and counterbores 338, 340 of the second support 326 and secured and tightened to the second threaded ends 346 of the tie rods 342 to preload the blanks 110 to the mandrel 302 between the supports 324, 326. The nuts 348 may be manually torqued, or in an alternate embodiment, a hydraulic tie rod actuator could be used for automatic torquing of the nuts 348 and concomitant tensioning of the tie rods 342. Thereafter, the first clamp 310 may be clamped to the first end 304 of the mandrel 302 to axially trap the first support 324 between the mandrel body central portion 308 and the clamp 310, and the second clamp 312 may be clamped to the second end 306 of the mandrel 302 to axially trap the stack 100 and the supports 324, 326 between the first clamp 310 and the second clamp 312. The clamps 310, 312 may secure the mandrel 302 against vibration after the supports 324, 326 have been pinned the clamps 310, 312.

As illustrated in FIG. 15, a rotatable slitting cutter M may be used to make longitudinal and radial cuts equidistantly circumferentially between the passages 30 of the blanks 110 (FIG. 11). The illustrated cutter M includes a cutter body B and cutter inserts I that are carried by the cutter body B and that may be interchangeable. In other embodiments, the cutter M may include a high speed steel saw mounted on an arbor, a slot cutter, or any other suitable type of cutter. The wall thickness of the blanks to be cut determines the diameter and hub size of the cutter M. In still other embodiments, any other suitable type of device may be used to cut or separate the blanks into individual toe clamps, e.g., wire electro-discharge-machining (wire EDM), laser, water, etc. In any case, the cutter (or other device) is moved along a plane that precisely intersects the same centerline as that of the end surfaces (accounting, of course, for manufacturing tolerances).

Referring to FIG. 16, once loaded and clamped, the fixture 300 may be mounted to a cutting machine tool T to cut the blanks 110 of the blank stack 100 into the individual toe clamps. As just a few of many examples, the cutting machine tool T may be a conventional three axis vertical milling center, a four axis horizontal milling center, or a 4½ or five axis vertical milling center. Because each blank stack 100 is preloaded using the tie rods, the stack 100 is stiff enough to span a large axial distance between the clamps 310, 312. In one example, the span may be about 222 mm. But the milling center type has some influence on the length of the stack. For example, a three axis mill may use a ten blank stack 100 as illustrated in the figures. A longer axis is favorable to making more parts. For a four axis mill, a shorter length may be desirable for fixturing on vertical tombstones, which are multi-sided rotatable fixtures for milling centers. For a five axis mill, the clamps may be eliminated and the length limited to avoid undesirable vibration.

Figure 17:
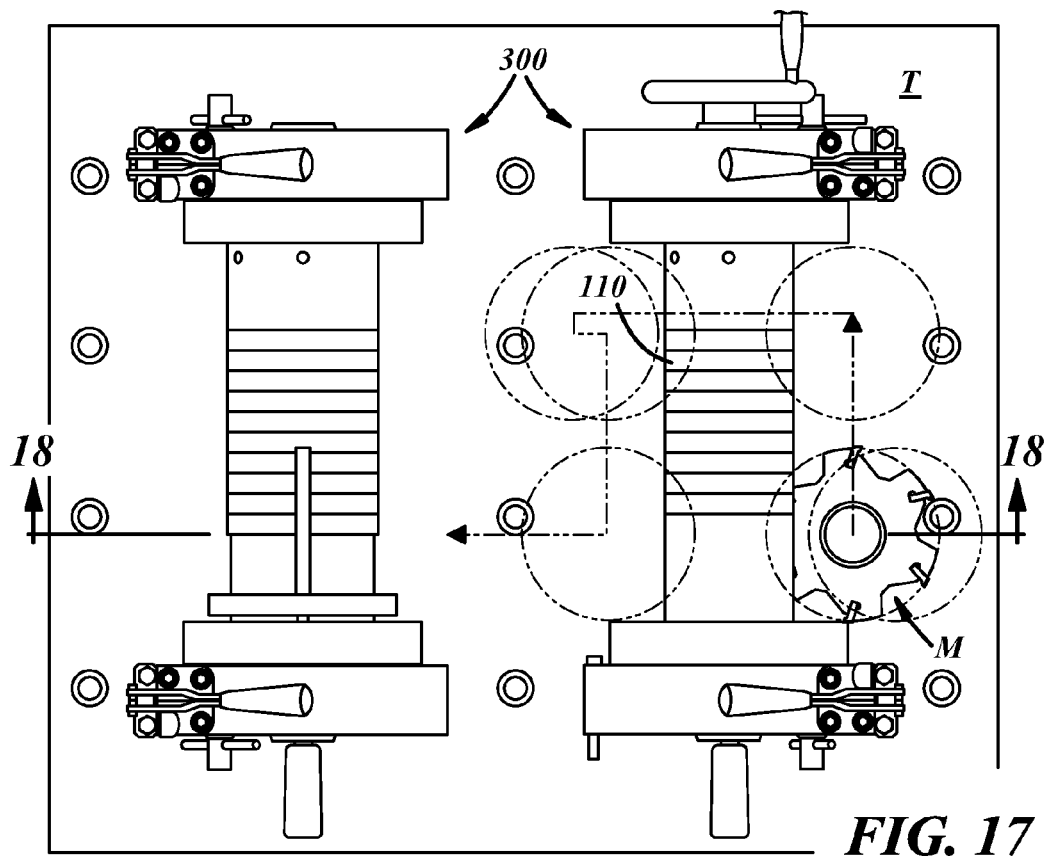
FIG. 17 is a plan view of a cutting operation including the fixture of FIG. 11 and the cutter of FIG. 15.

In the three axis vertical milling center embodiment, as illustrated in FIGS. 17 and 18, one or more of the fixture 300 may be mounted to a flat plate or milling table T of the milling center. The primary machining movement is along X and Y axes and four (or five) indexes may be used to cut ten of the toe clamps from each of the ring blanks 110 (FIG. 17). Opposed sides of the stack may be cut per index, for two cuts per index. In this embodiment the cutter M may stay fixed in a Z-axis and the flat plate T may be moved in the X and Y axes.

Figure 19:
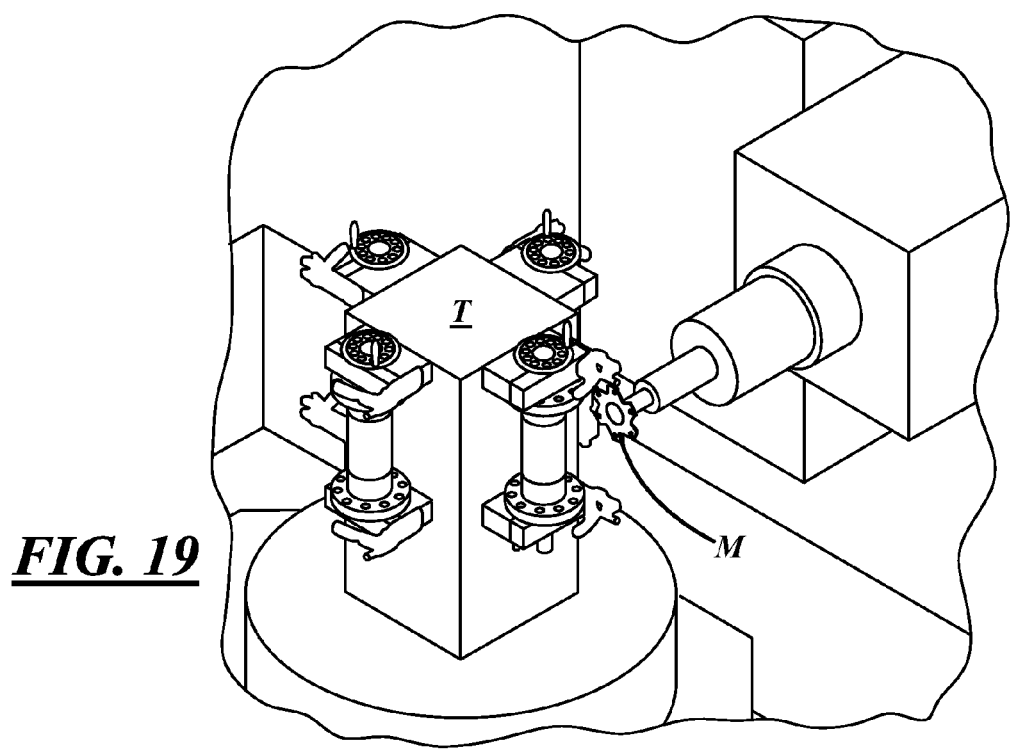
FIG. 19 is an enlarged fragmentary perspective view of a machine tool set up including the cutter of FIG. 15 and the fixture of FIG. 11.
Figure 20:
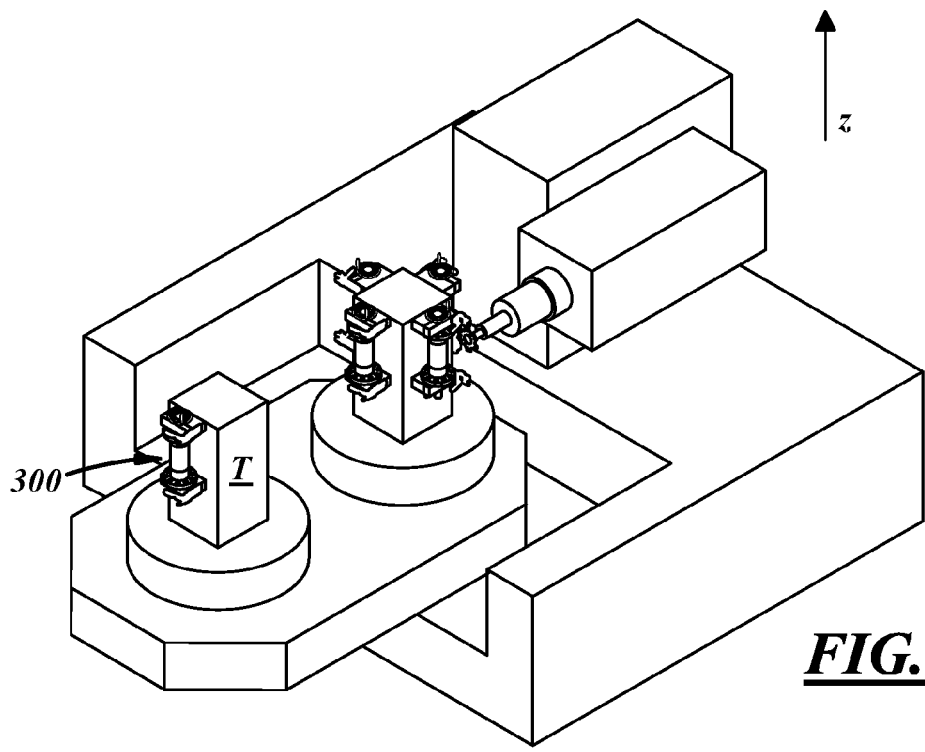
FIG. 20 is a fragmentary perspective view of a machine tool set up including the cutter FIG. 15 and the fixture of FIG. 11.
Figure 21:
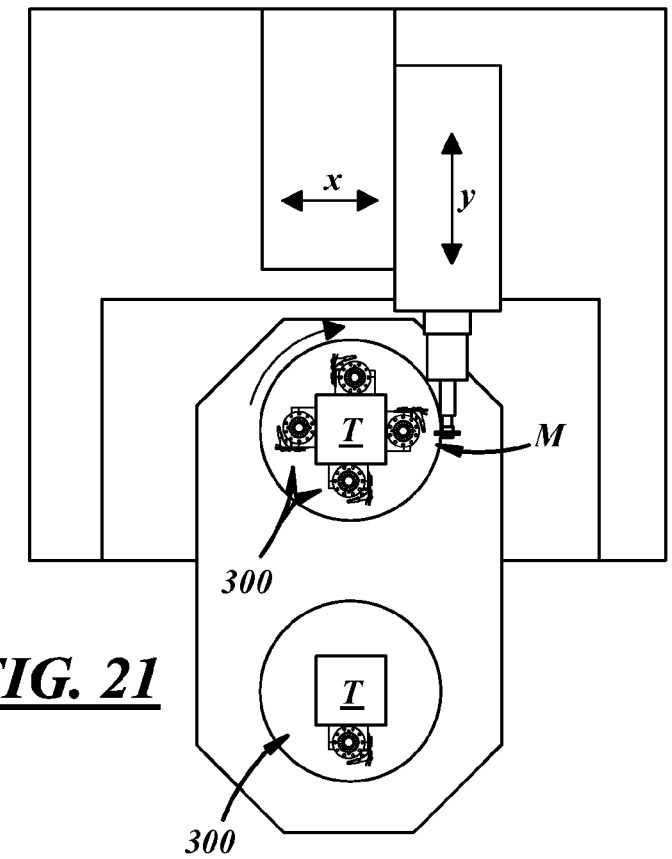
FIG. 21 is a top view of the machine tool set up of FIG. 20.

In the four axis horizontal milling center embodiment, as illustrated in FIGS. 19-21, a plurality of the fixture 300 may be mounted to multiple sides of tombstones T. In this embodiment, 180° of each stack are accessible to the cutter M of the milling center so that at least half of the cuts can be made using the milling center C-axis for positioning. Primary cutting may take place in Z and Y axes. Therefore, the fixtures 300 may require only two separate index positions, 180° apart, wherein only two indexes may be used to cut ten of the toe clamps from each of the ring blanks. In this embodiment eight fixtures may be used to fill out to four-sided tombstones for a typical arrangement where one full tombstone is in process in the machine in another full tombstone is off-line ready for loading into the machine.

Figure 22:
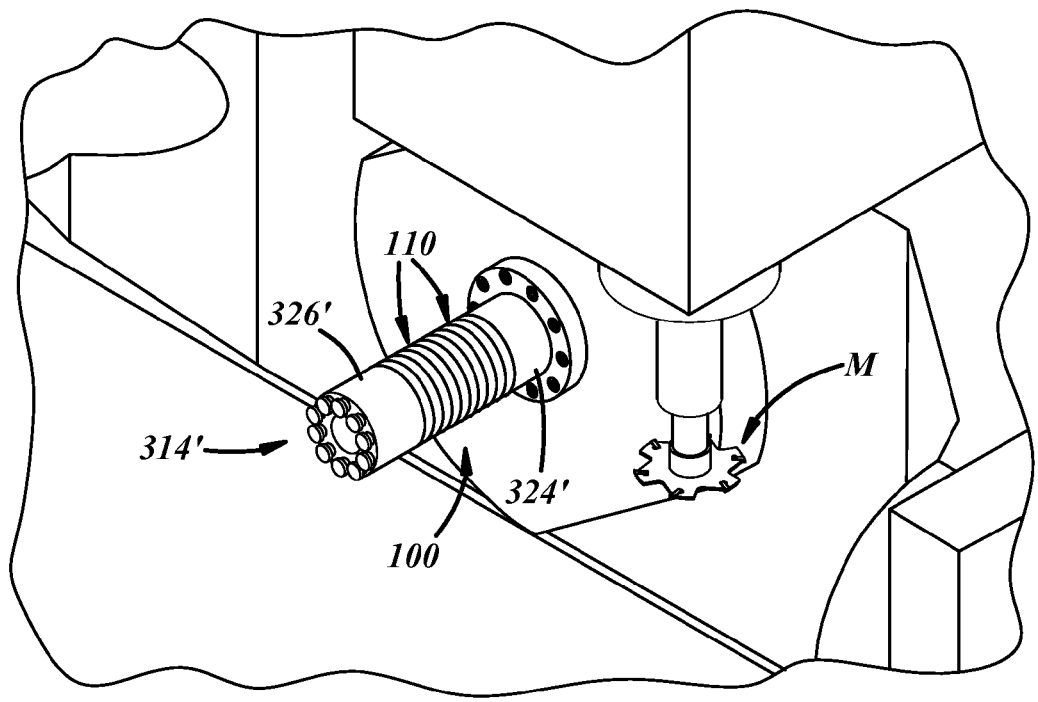
FIG. 22 is an enlarged fragmentary perspective view of the machine tool set up including the cutter of FIG. 15 and a fixture according to another illustrative embodiment of the present disclosure.
Figure 23:
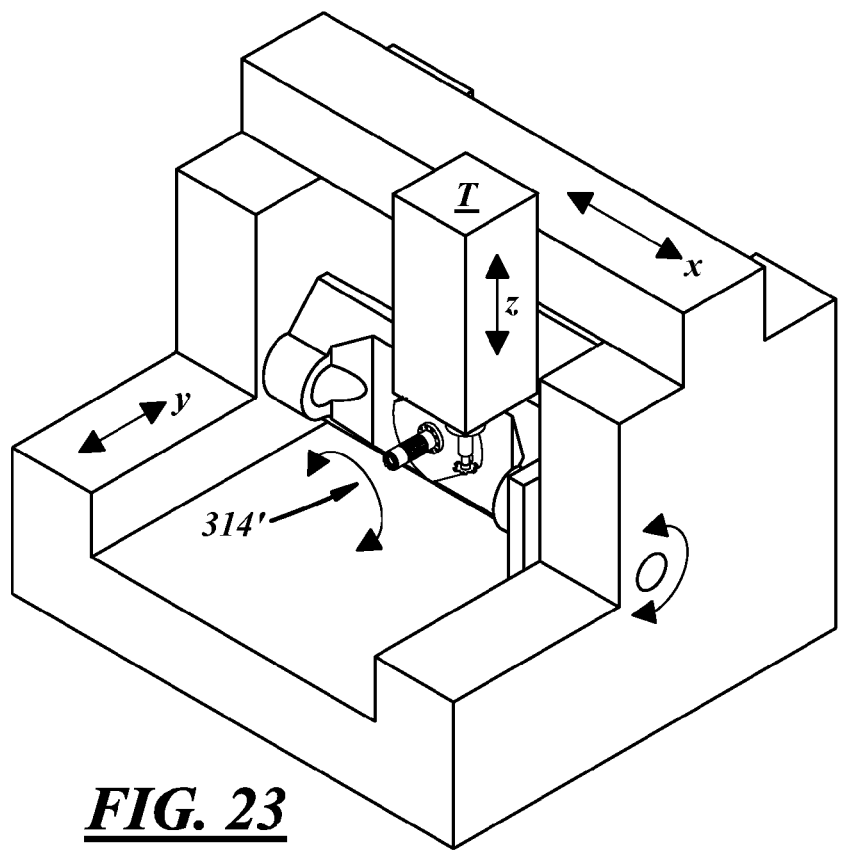
FIG. 23 is a perspective view of the machine tool set up of FIG. 22.
Figure 24:
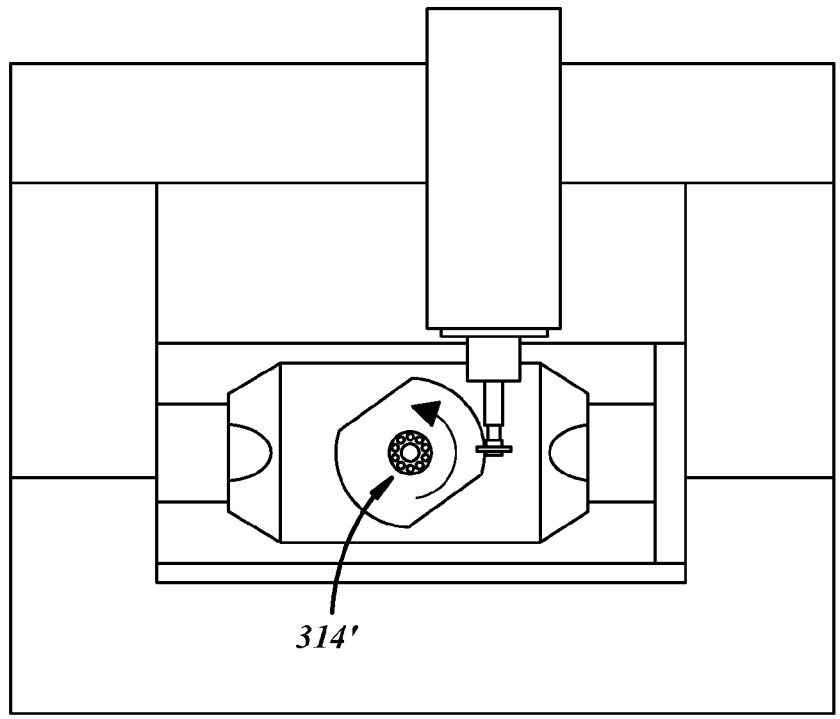
FIG. 24 is an elevational view of the machine tool set up a FIG. 22.

In the 4½ or five axis milling center embodiment, as illustrated in FIGS. 22-24, a single fixture 314' may be cantilevered to a C-axis table. The fixture 314' could be fixed or removable depending upon pallet loading options available for the milling center. In this example the fixture 314' need not include the clamps, and instead may include supports 324', 326'. In this embodiment, all cuts may be completed in one cycle without having to manually index the fixture 314' because the fixture 314' is automatically indexed by the C-axis of the milling center.

Figure 12:
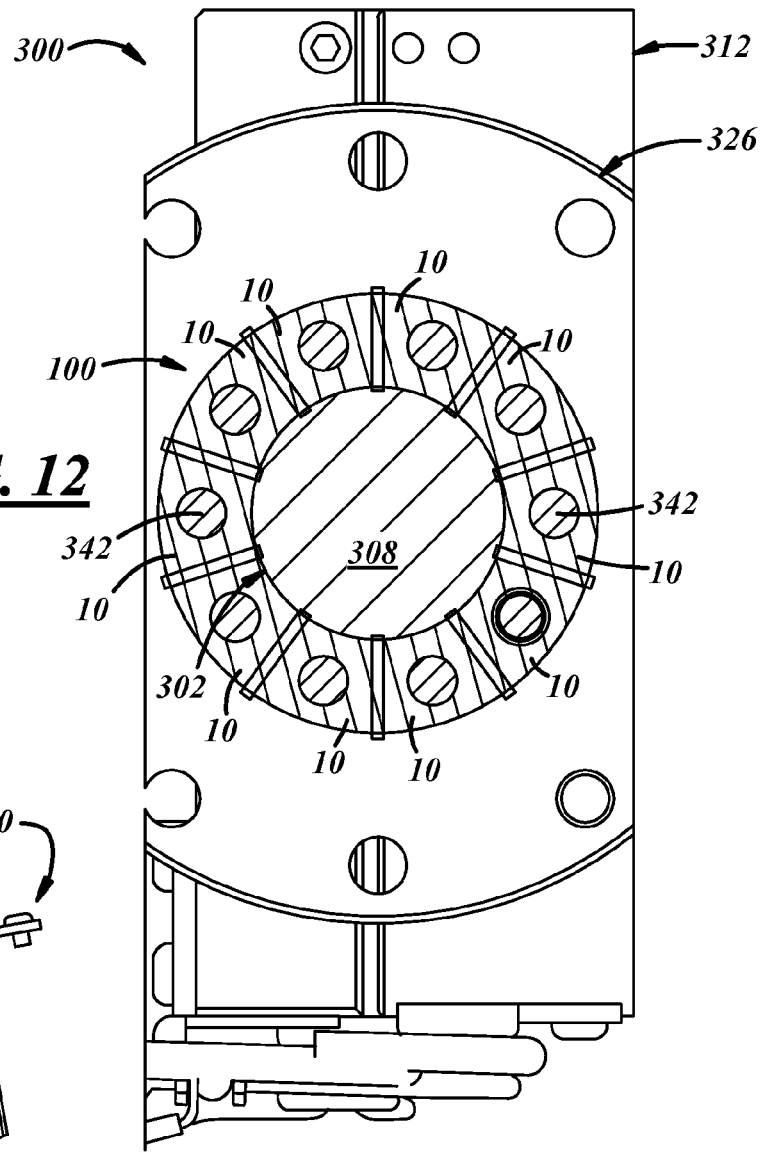
FIG. 12 is a cross-sectional view of the fixture of FIG. 11 taken along line 12 of FIG. 11.

In any embodiment, and with reference to FIG. 12, after producing all of the longitudinal or axial cuts, each toe clamp 10 remains secured by the fixture 300. More specifically, each toe clamp 10 remains loaded by the tie rods 342 in contact between the mandrel body central portion 308 and the tie rods 342. The toe clamps 10 may be unloaded from the fixture 300 by removing the second clamp 312 (FIG. 11) and/or the second support 326' (FIG. 22) in inverting the remaining portion of the fixture 300, 314' to allow the clamps 10 to slide off of the tie rods 342. The clamps 10 may be tumble debarred in bulk after separation from the fixture.

In another embodiment, a six-axis lathe with Y axis capability could also be used. In other embodiments, the toe clamps may be manufactured individually from machined bar stock, from stamped heavy-gage sheet metal, or from powder metal or injection molding, but with higher cost and possibly inferior materials or integrity.

Figure 25:
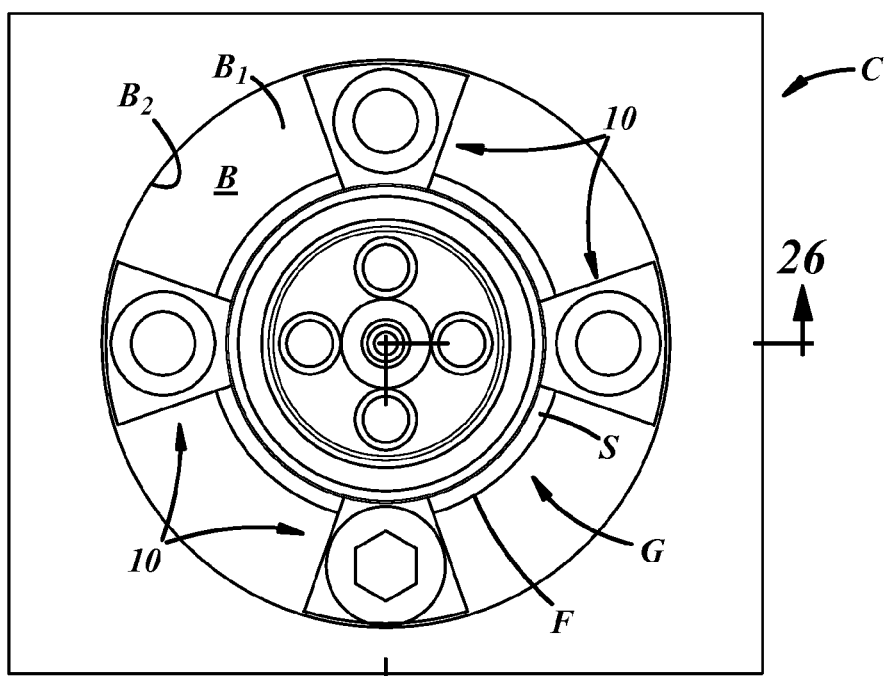
FIG. 25 is a top view of a presently preferred form of another toe clamping arrangement including toe clamps according to FIG. 2.
Figure 26:
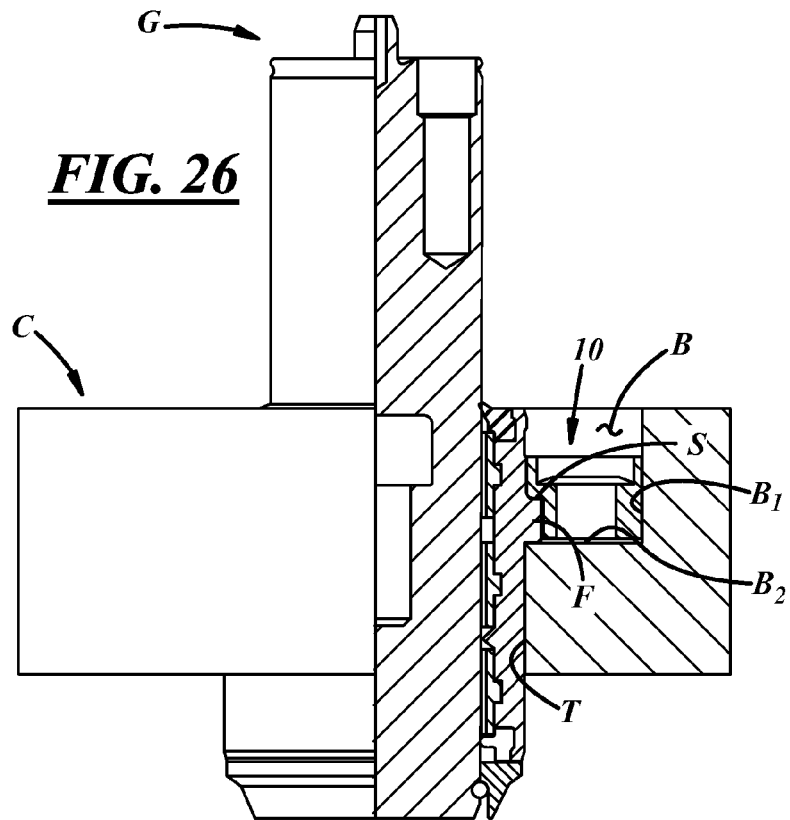
FIG. 26 is a quarter-sectional elevational view of the toe clamp arrangement of FIG. 25, taken along line 26-26 of FIG. 25.
Figure 27:
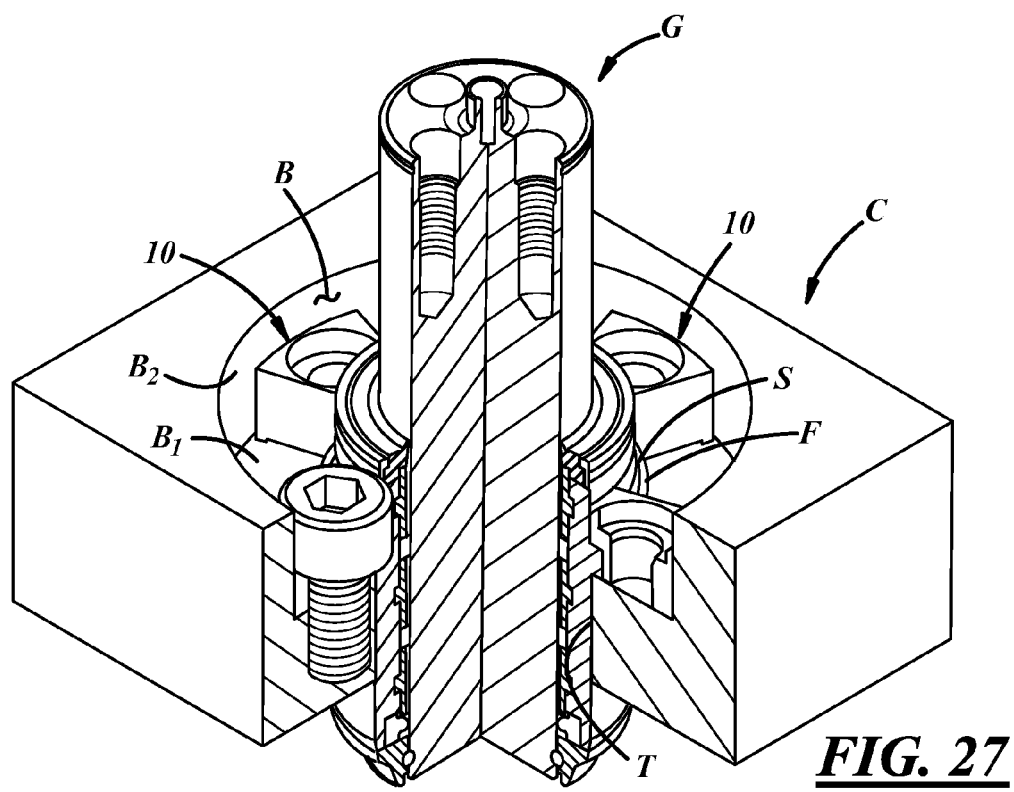
FIG. 27 is a fragmentary perspective view of the toe clamp arrangement of FIG. 25.

FIGS. 25-27 illustrate another presently preferred form of a toe clamping arrangement. This form is similar in many respects to the form of FIGS. 1-8 and like numerals between the forms generally designate like or corresponding elements throughout the several views of the drawing figures. Accordingly, the descriptions of the embodiments are hereby incorporated into one another, and description of subject matter common to the embodiments generally may not be repeated.

Referring to FIGS. 25-27, a toe clamping arrangement includes a die component C having a throughbore T and a counterbore B in communication with the throughbore T and having a side wall B1 and an end wall B2. The arrangement also includes a die device G carried in the throughbore T and including a flange F locating against the end wall B2 of the counterbore B and having a shoulder surface S for cooperation with the toe clamps 10. The arrangement further includes the toe clamps 10 located against the end wall B2 of the counterbore B between the side wall B1 of the counterbore B and the die device G. The counterbore need not be conical or tapered to facilitate assembly and the clamps 10 may fit snugly within the counterbore and, thus, the arrangement may be particularly compact.

In any case, and in contrast to prior art approaches, the presently disclosed toe clamps may be of compact design for efficient use of material, to distribute pressure uniformly over a surface of a device to be clamped, to enable more compact spacing of clamped die devices, and/or to facilitate toe clamp usage in a counterbored application with suitable compactness and straight bore machining.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention as defined by the following claims.

The invention claimed is:

1. A method of manufacturing toe clamps, comprising the steps of:
    machining a plurality of cylindrical blanks, each including throughbores;
    stacking the blanks to circumferentially align the throughbores and establish a blank stack having a longitudinal centerline; and
    cutting the blank stack along an axial direction parallel to the longitudinal centerline, and along a radial direction that radially intersects the longitudinal centerline, and circumferentially between adjacent throughbores to produce a plurality of toe clamps generally shaped like hollow cylinder sectors.

2. A method of manufacturing toe clamps, comprising the steps of:
    turning a plurality of cylindrical blanks into turned blanks, each having an inside diameter and an outside diameter;
    machining the turned blanks into machined blanks, each having a plurality of circumferentially spaced throughbores and a plurality of circumferentially spaced counterbores corresponding to the throughbores;
    stacking the machined blanks to radially align the inside and outside diameters and circumferentially align the arrays of throughbores to produce a radially and circumferentially aligned blank stack having a longitudinal centerline; and
    slitting the blank stack along an axial direction parallel to the longitudinal centerline, and along a radial direction that radially intersects the longitudinal centerline, in a plurality of locations circumferentially between adjacent counterbores to produce a plurality of toe clamps in the general shape of cylindrical ring segments.

3. A toe clamp, comprising:
    a bottom surface;
    a top surface spaced apart from the bottom surface;
    a cylindrical radially outer end surface extending between the bottom and top surfaces and having a centerline;
    a cylindrical radially inner end surface extending between the bottom and top surfaces and having the same centerline as the radially outer end surface;
    a pair of circumferentially facing side surfaces radially extending between the radially inner and outer end surfaces along directions that substantially intersect the same centerline as that of the end surfaces; and a passage extending between and intersecting at least one of the bottom and top surfaces and located circumferentially between the pair of circumferentially facing side surfaces.

4. The toe clamp of claim 3, wherein the bottom and top surfaces are planar.

5. The toe clamp of claim 4, further comprising:
an additional bore extending between and intersecting at least one of the bottom and top surfaces and located circumferentially between the pair of circumferentially facing side surfaces.

6. The toe clamp of claim 3, further comprising:
a radially intermediate surface extending between the bottom and top surfaces, axially spaced from the radially inner end surface, and having the same centerline as the radially inner and outer end surfaces.

7. The toe clamp of claim 3, wherein the passage includes a throughbore extending between and intersecting the bottom surface, and a counterbore in the top surface and coaxial with the passage.

8. The toe clamp of claim 3, further comprising:
an annular relief in the bottom surface at the radially outer end surface.

9. A toe clamping arrangement comprising a plurality of the toe clamp recited in claim 3 and further comprising:
a die component including a throughbore, and a counterbore in communication with the throughbore and having a side wall and an end wall; and
a die device carried in the throughbore and including a flange locating against the end wall of the counterbore and having a shoulder surface for cooperation with the toe clamps,
wherein the toe clamps are located against the end wall of the counterbore between the side wall of the counterbore and the die device.

10. The toe clamp of claim 3 wherein the cylindrical radiantly inner end surface is stepped and further comprises a cylindrical intermediate surface extending between the top and bottom surfaces, disposed radially outward of the cylindrical radiantly inner end surface and having the same centerline as the radiantly inner end and outer end surfaces.

11. The toe clamp of claim 10 further comprising an axially facing shoulder disposed between the cylindrical radially inner end surface and the cylindrical intermediate surface.

12. A fixture to carry a radially and circumferentially aligned stack of cylindrical blanks, each having inside and outside diameters and a plurality of circumferentially spaced throughbores disposed between the inside and outside diameters, the fixture comprising:
a mandrel, to extend through inside diameters of the blanks;
a first support carried on the mandrel, to contact a first end of the stack;
a plurality of tie rods coupled to the first support, wherein the tie rods are disposed in an equidistantly spaced circumferential array, to extend through the throughbores of the blanks; and
a second support carried on the mandrel and coupled to the plurality of tie rods, to contact a second end of the stack,
wherein the tie rods are tightenable to at least one of the supports to preload the stack between the supports.

13. The fixture of claim 12, wherein the mandrel includes first and second ends, a body between the first and second ends and having a diameter larger than that of the first and second ends, a shoulder between the body and the first end, and a tapered surface between the body and second end.

14. The fixture of claim 12, further comprising:
a first clamp coupled to a first end of the mandrel; and
a second clamp coupled to a second end of the mandrel, to axially trap the supports and the tie rods between the first clamp and the second clamp,
wherein the mandrel is rotatably carried by the clamps, and is indexable to a plurality of circumferential positions with respect to the clamps.

15. The fixture of claim 12, wherein the tie rods include fixed ends threaded to the first support and free ends extending into throughbores of the second support.

16. The fixture of claim 15, further comprising:
a plurality of nuts coupled to the free ends of the tie rods, wherein the tie rods are tightenable by tightening the nuts to the free ends of the tie rods.

\* \* \* \* \*